United States Patent [19]

Rathmann et al.

[11] Patent Number: 4,758,835

[45] Date of Patent: Jul. 19, 1988

[54] SYSTEM FOR THE LOCKING AND/OR UNLOCKING OF A SECURITY DEVICE

[75] Inventors: Klaus Rathmann, Frankfurt am Main; Rupert Janofske, Kronberg Ts; Hans-Joachim Schröder, Wiesbaden; Heinz Allerdist, Bad Homburg von der Hohe; Gerhard Rössler, Frankfurt am Main, all of Fed. Rep. of Germany

[73] Assignee: VDO Adolf Schindling AG, Frankfurt am Main, Fed. Rep. of Germany

[21] Appl. No.: 897,694

[22] Filed: Aug. 18, 1986

[30] Foreign Application Priority Data

Aug. 21, 1985 [DE] Fed. Rep. of Germany ....... 3529882

[51] Int. Cl.$^4$ ......................... G06F 15/30; G07F 7/10

[52] U.S. Cl. ...................... 340/825.310; 340/825.720; 361/172

[58] Field of Search ...................... 340/825.31, 825.56, 340/825.69, 825.72; 361/171, 172; 235/379, 380, 382, 382.5, 375

[56] References Cited

U.S. PATENT DOCUMENTS

| | | | |
|---|---|---|---|
| 4,048,475 | 9/1977 | Yoshida | 235/380 |
| 4,352,011 | 9/1982 | Guillou | 235/375 |
| 4,471,216 | 9/1984 | Herve | 235/380 |
| 4,509,093 | 4/1985 | Stellberger | 340/825.31 |
| 4,535,333 | 8/1985 | Twardowski | 340/825.31 |
| 4,596,985 | 6/1986 | Bongard et al. | 340/825.69 |

OTHER PUBLICATIONS

EP 0140388, May 1985, Atalla.

*Primary Examiner*—Donald J. Yusko

*Attorney, Agent, or Firm*—Martin A. Farber

[57] ABSTRACT

A system for the locking and/or unlocking of a security device, particularly an automobile locking device, comprising a transmitting device for transmitting coded data recording, a receiving device for receiving the coded data recording, a transmitter-end storage and a receiver-end storage for storing codes and a comparator for comparing the received data recording with the stored data recording, a control signal being adapted to be given off to the security device from the receiving device in the event that said data agree. The receiving device has a signal generator to produce several further coded data which are stored in the transmitting device and in the receiving device and can be employed upon the subsequent use of the system. The further coded data recording may be random number and/or algorithms for changing the random numbers. The production of the further coded data recording is effected preferably upon actuation of the ignition lock.

15 Claims, 4 Drawing Sheets

SYSTEM FOR THE LOCKING AND/OR UNLOCKING OF A SECURITY DEVICE

FIELD AND BACKGROUND OF THE INVENTION

The present invention relates to a system for the locking and/or unlocking of a security device, particularly an automobile locking device, having a transmitting device for transmitting coded data recording, a receiver device for receiving the coded data recording, a storage on the transmitter end and one on the receiver end for storing codes, and a comparator for comparing the data recording received with the data recording stored, a control signal being adapted to be given to the security device from the receiving device in the event that such data recording agrees.

Devices in which coded data recording is emitted by a transmitter in order to actuate security devices are known in particular as door locks for automobile doors and they already possess a high degree of security against unauthorized opening of the car doors.

However, there is the possibility of recording the coded data recording with a receiving device during an opening process and, by subsequently transmitting this data recording, of readily opening the parked, locked car without any damage to it.

Thus there has already been proposed a control device for the locking and/or unlocking of a security device of the aforementioned type in which the receiver has a signal generator for generating further coded data recording and the further coded data recording can be stored in the storage of the receiver device and sent out by a transmitter to the receiver device, and the transmitting device has a receiver to receive the further coded data recording and the further coded data recording can be stored in the storage of the transmitting device.

SUMMARY OF THE INVENTION

It is an object of the invention to create a system for the locking and/or unlocking of a security device which, with a high degree of security, prevents the unauthorized unlocking of the security device.

According to the invention, the receiver device (2) has a signal generator for generating a plurality of further coded data recording and the further coded data recording can be stored in the storages of the transmitting device (1) and receiving device (2).

By this development, the coded data recording can be changed as frequently as desired so that even in the event that the coded data recording is recorded, a subsequent unauthorized opening of the security device is prevented even if on such occasion the attempt should be made to draw conclusions as to the following data recording by recording a plurality of coded data and comparing the coded data. In this connection the changing of the code of both the receiving device and of the transmitting device takes place by itself, after it has once been introduced.

Thus in the case of a remote-controlled security device the security against unauthorized opening is considerably improved.

The production and transmission as well as the storage of the further coded data recording can preferably be turned on by a switch on the receiving device. If the switch is the ignition switch (battery terminal 15) of the vehicle, then a completely new coding is automatically effected upon each start or at a later time, this new code being stored both in the receiving device and in the transmitting device. In this connection, in each case several random numbers which are completely independent of each other can serve as code. However, in addition to one or more random numbers it is also possible to generate an algorithm which is also stored with the random number or numbers in the receiving device and the transmitting device. In this way, the number of codes which can be used until the next recoding is increased without too large a storage for the storing of a correspondingly large number of random numbers being required in the transmitting device.

The algorithm and the number of times it is used can be so selected that it is not possible to figure out the coding which will be used next from the previously recorded coded data recording before a new random number is used. In particular, even if several random numbers are stored, figuring out of the algorithm is made difficult by the fact that in the event of unauthorized recording of the coded data recording sent out by the transmitting device, it is not evident whether two successively recorded coded data are two data which are differently coded from each other due to the use once of the algorithm, whether two data which differ by repeated use of the algorithm are present (as would be the case if one or more coded data had not been recorded) or whether one of the coded data recorded represents a new random number.

The storing of a suitable number of random numbers and/or the deriving of further codes by means of an algorithm permits multiple effecting of the unlocking and locking without a new code having to be generated inbetween in the receiving device; in other words, the code used is changed from one unlocking or locking process to the next even if no recoding takes place. Thus it is possible to open and close a car several times with the use of a different code in each case without actuating the ignition switch in between. This is necessary, for instance, at camping sites where the vacationer only infrequently uses his car for driving but opens and closes the doors several times a day.

In one embodiment of the system, upon a recoding, ten random numbers are generated and the possibility is provided of varying each of the ten random numbers nine times by means of an algorithm. In this way, a hundred different codes can be used one after the other unless recoding is effected beforehand by actuation of the ignition switch.

In accordance with a further development of the invention, the algorithm can be made variable insofar as it is dependent on the random number which is applicable at the time. In this way it is possible, for instance, to use a first algorithm for the changing of the first random number stored after recoding and a second algorithm after the second random number, etc.

The transmission of the random number produced for the recoding and of the algorithm should be protected against unauthorized recording. In accordance with a further development of the invention, the transmission takes place when the ignition key, which is physically connected to the transmission device, is inserted into the ignition lock. The transmission can then take place over a very short path within the closed car so that unauthorized reception of the coded data recording from the outside becomes practically impossible.

In accordance with an improvement in this development, the transmitting of the random numbers and of the algorithm can take place at a time which is also determined on basis of random numbers and thus is not known to third parties. Due to the fact that after a recording a relatively large number of codes are stored, the system of the invention retains its reliable operation even if a recording which in itself is provided for and introduced does not in the final analysis take place, for instance because the driver of the vehicle again turns off the car before the above-mentioned time, determined on basis of random numbers, for the transmitting of the recoding has transpired.

In the system of the invention it need merely be seen to it that the same codes are present in both storages. For this purpose it is necessary to effect a transmission of the new code only when it has been established by suitable acknowledgement signals between the transmitting device and the receiving device that proper transmission is assured.

BRIEF DESCRIPTION OF THE DRAWINGS

With the above and other objects and advantages in view, the present invention will become more clearly understood in connection with the detailed description of a preferred embodiment, when considered with the accompanying drawings, of which.

In the figures the same parts bear the same reference numbers.

DETAILED DESCRIPTION OF THE PREFERRED EMBODIMENT

Figure 1:
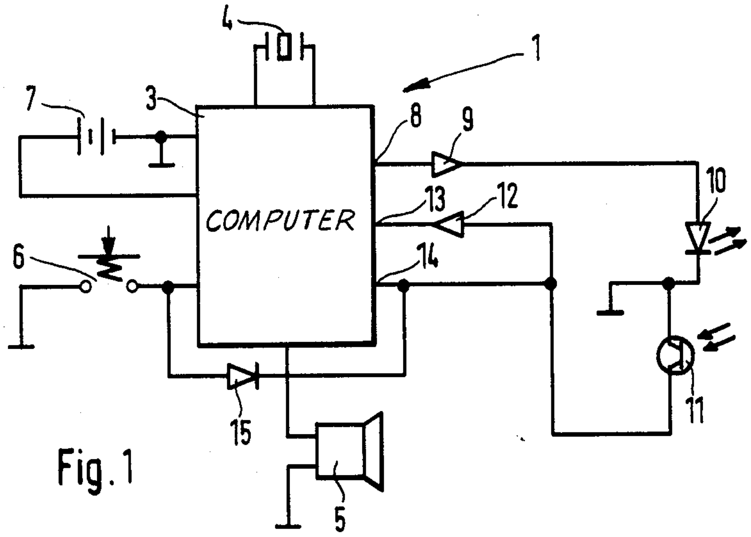
FIG. 1 is a simplified circuit diagram of a transmitting device.

The transmission device 1 of FIG. 1 comprises a microcomputer 3 which is preferably developed as a single-chip computer and with which a piezoelectric crystal 4 is associated as clock. The current is supplied by a battery 7 which, in order to obtain smaller overall dimensions of the device of FIG. 1, is developed in the form of a button cell. A push-button switch 6 serves for turning on the transmitting device. One output 8 of the microcomputer 3 leads via an amplifier 9 to a light-emitting diode 10. A receiver 11 formed by a phototransistor is connected via another amplifier 12 to a coding input 13 of the microcomputer 3. The receiver 11 is furthermore connected to an activating input 14 of the microcomputer 3. This activating input 14 can furthermore be controlled via a diode 15 by the switch 6.

Figure 2:
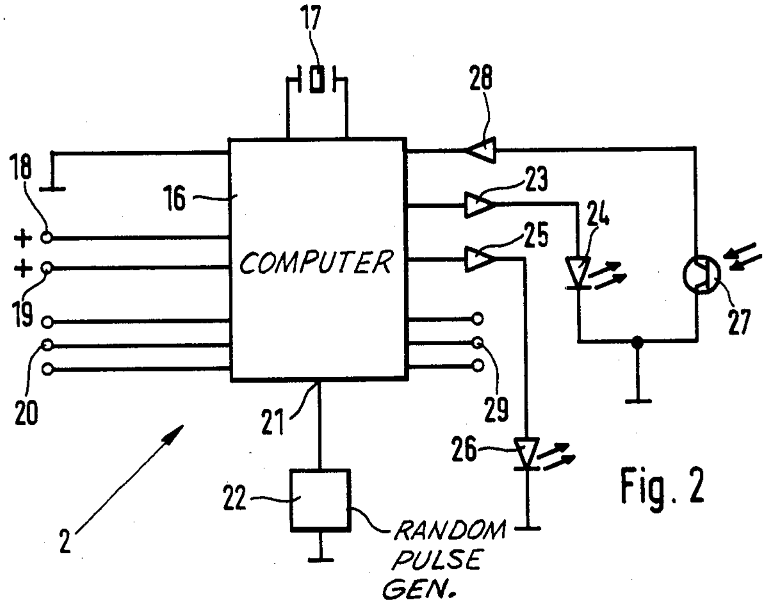
FIG. 2 is a simplified circuit diagram of a receiver device.

The operation of the transmitting device 1 as well as of the receiving device of FIG. 2 which is described in the following paragraph will be explained in further detail later on in connection with FIGS. 3 and 4.

The receiving device 2 also has a microcomputer 16 with a piezoelectric crystal 17. The microcomputer 16 is connected via the terminal 18 to the source of current of the vehicle (battery terminal 30). The terminal 19 is connected to the ignition switch (terminal 15) of the vehicle so that the microcomputer 16 is activated whenever the ignition is turned on.

Each of the inputs 20 of the microcomputer 16 is associated with a lock arranged in a door of the car and can, by mechanical actuation by means of a key, be used to activate the microcomputer 16 if the normal operation of the control device has been disturbed.

A generator 22 which produces random pulse trains is connected to another input 21 of the microcomputer 16. A transmitter 24 formed by a light-emitting diode is connected via an amplifier 23 to an output of the microcomputer 16. Furthermore, another transmitter 26 formed by another light-emitting diode is also connected via an amplifier 25 to an output of the microcomputer 16.

Receiving means 27 formed by a phototransistor are connected via an amplifier 28 to an input of the microcomputer 16. Each of the three inputs 29 of the microcomputer 16 leads to a locking device of the central locking system of the car and transmits the actuating signal given off by the microcomputer 16.

The program stored in the microcomputer 3 of the transmitting device is started up at 31 (FIG. 3) when the microcomputer 3 receives a corresponding command by the actuating of the push-button switch 6. Coded data recording is then sent out at 33 (with the aid of the light-emitting diode 10 in FIG. 1). After receipt of the coded data recording in the receiving device 2 by means of the phototransistor 27 and the amplifier 28 (FIG. 2), continuation of the program in the receiving device takes place at 34. As long as no data recording is received this program passes via the program part 36 into a wait loop.

At 35 it is determined from the coded data recording received what transmitting device (key) sent out the data recording. For this purpose, additional data recording is added to the coded data recording. For each of the keys to be used the same program run is provided, but with different variables. Otherwise, upon a switching from one code to the other or upon recording it would be necessary to recode all keys, which is impossible due to the different places where the keys are kept.

Figure 3:
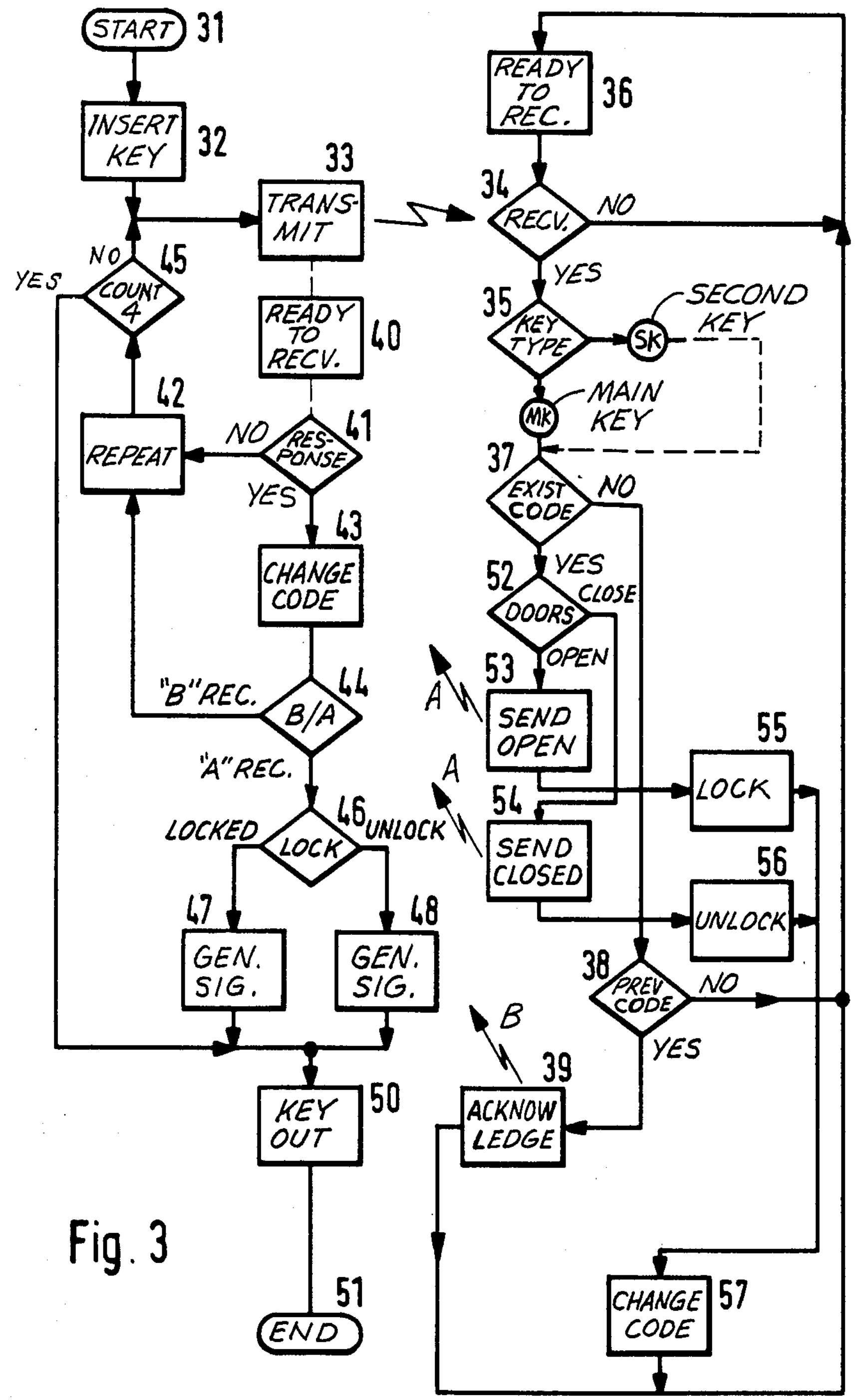
FIG. 3 is a flowchart of programs for the microcomputers contained in the transmitting device and the receiver device.

After it has been established, in the example shown in FIG. 3, that a main key (MK) is concerned, it is determined at 37 whether the coded data recording sent out represents a command which was coded with the code provided as next code for the actuating of the locking devices (existing code). If this is not the case it is then decided at 38 whether it is the code which was last used. If this is also not the case then the system of the invention assumes that an unauthorized code was used and passes via the program part 36, which is substantially delayed in order to make systematic trial and error difficult, again into readiness to receive.

However, if it is established at 38 that the last code used was sent out by the transmitter device, then an acknowledgement signal B is transmitted at 39 via the light-emitting diode 24 (FIG. 2) to the transmitting device, said signal being received by the phototransistor 11 (FIG. 1).

In the meantime the program of the transmitting device has passed from the sending of the coded data recording at 33, via a delay at 40 which determines the duration of the readiness to receive, to a branching 41 at which it is decided, as a function of the receipt of an acknowledgement signal, whether a repetition of the transmitted coded data recording is to take place at 42 or the code is to be changed at 43. If no acknowledgement is received by the transmitting device, then the code sent out is repeated four times, which is recorded in a branch 45. However, if an acknowledgement has been received then the code is changed at 43, as will be explained in further detail in connection with FIG. 4. At a further branching 44 the program is brought to the program part 42 if an acknowledgment signal B which indicated the reception of the previous code has been sent out by the receiving device. However, as will be described in more detail below, if the unlocking or locking of the doors is acknowledged by the receiving device by sending out an acknowledgement signal A, then the program is advanced from the branching 44 to the branching 46, this depending on whether the doors were locked or unlocked. At 47 and 48 a correspondingly different acoustic signal is given off in each case, whereupon the program is brought to its end 51 via the point 49 and via a program part 50 which disconnects the microcomputer 3.

If it has been determined at 37 that the existing code has been sent out it is tested at 52 whether the central lock is unlocked or locked. If the doors are locked (closed) then the program is continued at 54 with the sending out of an acknowledgement signal A to the transmitting device and an unlocking command is given at 56 to the central lock. If the doors, however, are unlocked upon the arrival of the coded data recording, then an acknowledgement signal A is sent out at 53 to the transmitting device and a locking command is given at 55. The code is then changed at 57, whereupon the program stays in the wait loop 34, 36 until the receipt of the next signal.

Figure 4:
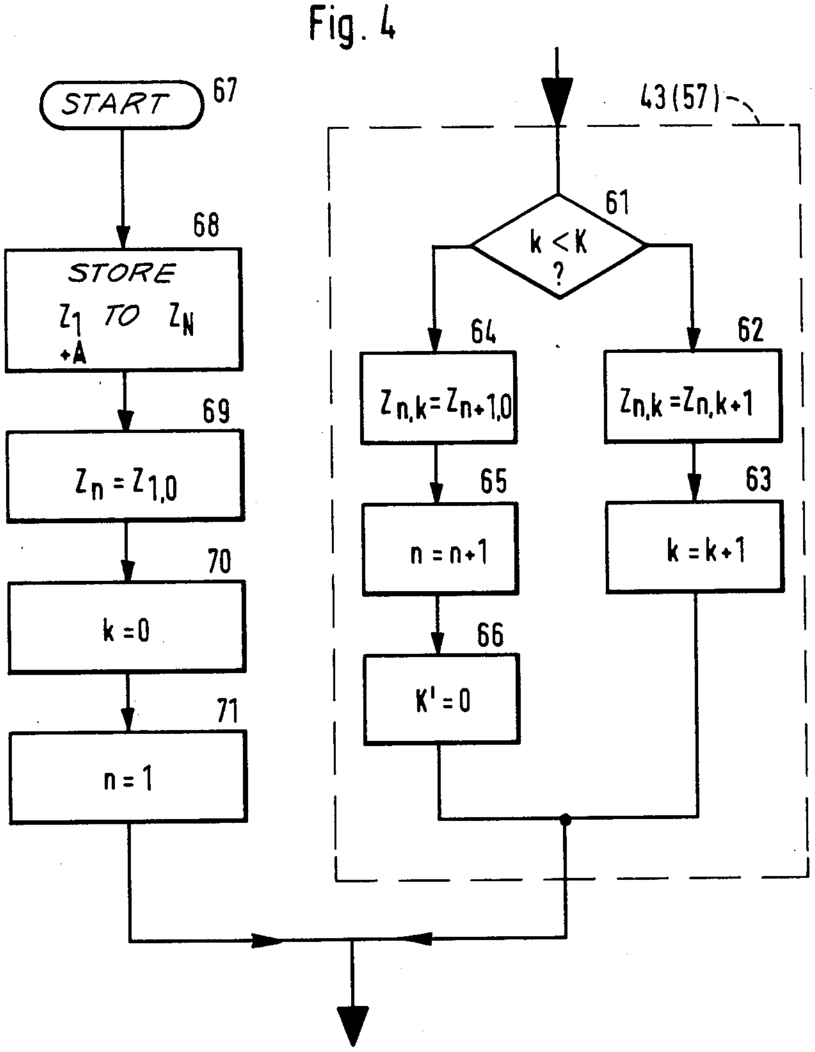
FIG. 4 is a flowchart of a program for the further switching of the coding after an unlocking or locking process.

The flowchart of FIG. 4 is a more detailed description of the program parts 43 and 57 of the flowchart of FIG. 3. It is assumed that, upon a recording, N random numbers ($Z_1$ to $Z_N$) and an algorithm A are generated and stored in the transmitting device and the receiving device. Furthermore, the algorithm A is used in each case K times. The coding is then based on the following numbers $Z_{1,k}$:

$Z_{1,0}$, $Z_{1,1}$, $Z_{1,2}$ to $Z_{1,K}$, $Z_{2,0}$, $Z_{2,1}$, $Z_{2,2}$ to $Z_{2,K}$ to $Z_{N,0}$, $Z_{N,1}$, $Z_{N,2}$ to $Z_{N,K}$.

Upon reaching the program part 43 or 57 it is first of all determined whether the next code is to take place by the use of the algorithm A or by the reading of the next random number $Z_n$ from the storage. If k is smaller than K then the algorithm has still not been used as frequently as intended, so that the algorithm is used at 62 and thereupon the subscript k is increased by 1 at 63. However, if k is equal to K, then, by means of the program part 64, a new random number $Z_{n,0}$ is read out of the storage, the subscript n is increased by 1 at 65 and the subscript k is set equal to 0 at 66. The program parts 67 to 71 are placed into action if a recording is effected by the transmitting device in which new random numbers $Z_1$ to $Z_N$ and a new algorithm are determined and transmitted into the storages of the transmitting and receiving devices. At 68, the random numbers determined and the algorithm are stored. At 69 the random number (code) currently present as variable in the program is set equal to the first random number and at 70 and 71 the subscripts k and n are brought to their initial values.

As compared with the change of the random numbers by an algorithm which is constant up to the next recoding which has been described in connection with FIGS. 3 and 4, further security against unauthorized detection of the code can be obtained in the manner that the algorithm is variable. Thus, for instance, upon a recoding several algorithms can be removed from storage and used in a predetermined sequence. The use of the algorithms can, however, also be made dependent on the instantaneous random number. Thus, for instance, a first algorithm can be used when a given bit is the random number 0 and a second algorithm when this bit is 1.

Figure 5:
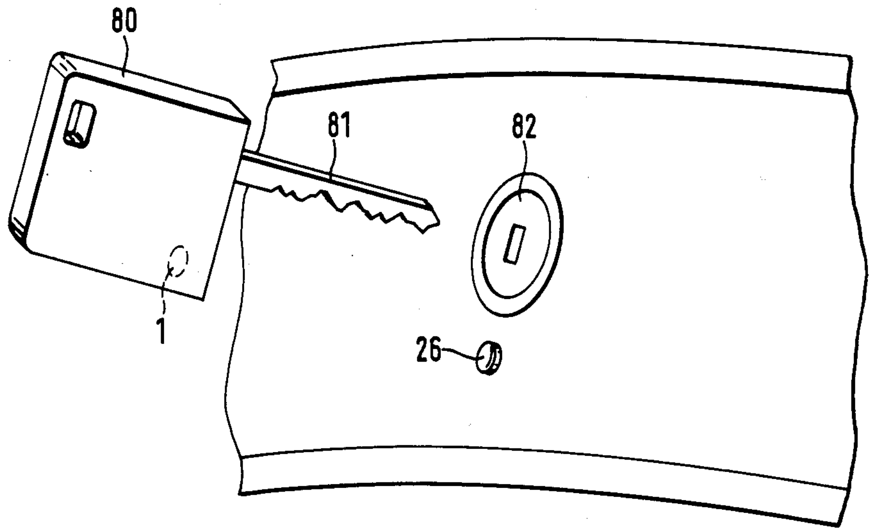
FIG. 5 is a diagrammatic showing of the transmission path for the recoding.

FIG. 5 shows diagrammatically an embodiment of a transmitting device 1 which is arranged in the handle portion 80 of an ignition key 81. After the introduction of the key 81 into the ignition lock 82, the ignition can be turned on in known manner and the engine of the vehicle started. In this way random numbers and an algorithm are generated in the receiver device (FIG. 2), sent out via the light-emitting diode 26 and received by a phototransistor 11 in the transmitting device.

The transmission of the further coded data recording in accordance with the invention can be made "eavesdropper proof" in the manner that it is transmitted after a random period of time after the actuation of the ignition lock. The invention is also not limited to the transmission of the further coded data recording being brought about by the actuating of the ignition lock. Thus, for instance, the exceeding of a predetermined speed can bring about the transmission. Furthermore the system in accordance with the invention can be so developed that transmission can be brought about intentionally by the user, for instance by actuating a button on the key. In this embodiment the second transmitter of the receiving device can possibly be done away with and the first transmitter—arranged, for instance, on the vehicle itself—can effect the transmission. The user can then effect a new coding at a time that he feels is secure against an unauthorized recording.

We claim:

1. A system for the locking and/or unlocking of a security device, particularly an automobile locking device, comprising a transmitting device for transmitting coded data; and a receiving device for receiving the coded data;

first storage means in said transmitting device for storing data to be transmitted;

second storage means in said receiving device for storing codes; and a comparator for comparing the data sent by said transmitting device with data stored in said second storage means, said receiving device including means for generating a control signal to activate the security device in the event that the data at said comparator is in agreement; and wherein said generating means comprises a signal generator for generating a plurality of further coded data suitable for storage in said first and said second storage means and sendable by the receiving device; and the further coded data comprises at least one random number and an algorithm, there being computers located in said transmitting device and in said receiving device for modifying the at least one random number in response to operation of said security device enabling the random number to be newly selectable for each locking operation; said system further comprising sending means located in said receiving device for sending a random number from said signal generator to said transmitting device; and accepting means located in said transmitting device for accepting the random number sent by the sending means, the computer of said transmitting device being operatively coupled to said accepting means for receiving the random number from the accepting means to provide the coded data to be transmitted by the transmitting device, the coded data transmitted by the transmitting device to the receiving device being based on a previous sending of the random number from the sending means of the receiving device to the accepting means of the transmitting device.

2. The system according to claim 1, wherein the further coded data is composed of a plurality of random numbers.

3. The system according to claim 1, wherein the algorithm is used for the repeated modification of a random number.

4. The system according to claim 1, wherein the algorithm can be changed from random number to random number.

5. The system according to claim 1, wherein for a locking of the security device, the same coded data is sent out by the transmitting device as was previously sent out for an unlocking.

6. The system according to claim 1, wherein said generating means generates an acknowledgement signal and wherein the deriving of the coded data by said computers to be sent out does not take place until the acknowledgement signal sent out by the receiving device is received by the transmitting device.

7. The system according to claim 1, wherein the receiving device further comprises an acknowledgement transmitter for acknowledging coded data received from the transmitting device.

8. The system according to claim 1, wherein the sending means is located in the immediate vicinity of an ignition lock of the vehicle and the further coded data is produced by said generating means after actuation of the ignition lock and then sent out.

9. The system according to claim 8, wherein the further coded data is sent out after a random period of time after actuation of the ignition lock.

10. The system according to claim 1, wherein said computers generate a number of codes which are derived in each case from a random number by use of an algorithm, the number of codes being smaller by 1 than the number of derived codes necessary for figuring out of the algorithm and whereupon a different random number is used.

11. The system according to claim 10, wherein the use of the algorithm is a multiple use of the algorithm.

12. The system according to claim 1, wherein said transmitting device is located within an automobile key.

13. A method, in a system for the locking and/or unlocking of a security device, particularly an automobile locking device, comprising a transmitting device, separate from the security device, for transmitting coded data; and a receiving device, coupled to the security device, for receiving the coded data;

first storage means in said transmitting device for storing data to be transmitted;

second storage means in said receiving device for storing codes; and a comparator for comparing the data sent by said transmitting device with data stored in said second storage means, said receiving device including means for generating a control signal to activate the security device in the event that the data at said comparator is in agreement; and wherein said generating means comprises a signal generator for generating a plurality of further coded data suitable for storage in said first and said second storage means and sendable by the receiving device; and the further coded data comprises at least one random number and an algorithm, there being computers located in said transmitting device and said receiving device for modifying the at least one random number;

the method of securely activating a lock, comprising the steps of generating a set of random numbers at the receiving device;

sending a random number from the receiving device to the transmitting device;

sensing operation of a lock at the receiving device;

selecting another of said random numbers of said set upon each operation of the lock by a computer at the receiving device;

sending the random number to the transmitting device;

updating a code with said another random number at the computers of both the transmitting and the receiving devices; and transmitting the code from the transmitting device to the receiving device.

14. The method according to claim 13 wherein said generating step employs an algorithm, said method including a further step of altering said algorithm is response to activation of vehicular ignition.

15. The method according to claim 14, further comprising:

locating said transmitting device in an automobile key;

placing said receiving device in an automobile;

inserting the key in an ignition lock; and transmitting code data from said transmitting device to said receiving device while the key is in the ignition lock.

* * * * *